United States Patent [19]
Olde

[11] 3,868,926
[45] Mar. 4, 1975

[54] AUTOMATIC WATER DISPENSER

[76] Inventor: Jarl Rune Olde, Laduvagen 4, 752 47 Uppsala, Sweden

[22] Filed: July 18, 1973

[21] Appl. No.: 380,492

[30] Foreign Application Priority Data
July 31, 1972 Sweden............................ 9969/72

[52] U.S. Cl. .................................................. 119/75
[51] Int. Cl............................................ A01k 07/00
[58] Field of Search..................... 119/75; 137/614.2

[56] References Cited
UNITED STATES PATENTS

| | | | |
|---|---|---|---|
| 326,829 | 9/1885 | Balch | 119/75 |
| 1,646,246 | 10/1927 | Hazard | 119/75 |
| 2,648,306 | 8/1953 | Adkins | 119/75 |
| 3,505,978 | 4/1970 | Nilsen | 119/75 |

*Primary Examiner*—Hugh R. Chamblee
*Attorney, Agent, or Firm*—Edelson and Udell

[57] ABSTRACT

An automatic water dispenser for animals, in particular poultry, having a drinking bowl within which is centrally disposed a vertically extending valve device adapted to supply drinking water into the bowl automatically upon tilting of the valve into open condition by the head of the animal seeking to drink from the bowl. The valve device, connected to a source of water supply, is normally held closed and is so designed that when opened as aforesaid, water is supplied upwardly through the valve to a point above the highest possible level of water in the bowl and thence downwardly for introduction into the bowl in the form of an outwardly and downwardly directed annular stream for self-cleaning of the bowl by washing its bottom free of settled foodstuff residues and the like which may then be suspended in and consumed with the water in the bowl.

7 Claims, 1 Drawing Figure

PATENTED MAR 4 1975
3,868,926
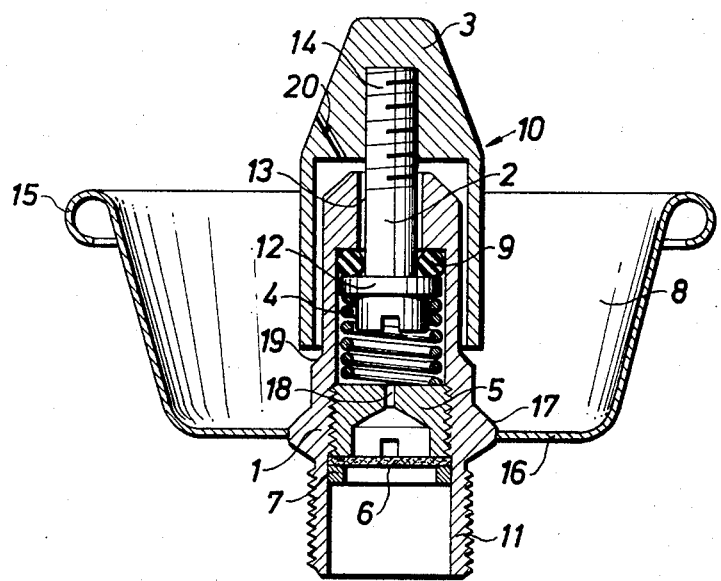

AUTOMATIC WATER DISPENSER

The invention relates to an automatic water dispenser for supplying water to animals, in particular a water dispenser for supplying water to poultry.

When water is supplied to animals it is important to minimize splashing in the environment of the dispenser and to keep the drinkning bowls clean in order to avoid bacteria growth.

The problem regarding bacteria growth is well known to the experts on this field and many attempts have been made to solve this problem. One attempt to solve the problem is described in Swedish Patent Specification No. 362 596. However, it appeared that the automatic water dispenser as described in this specification has not operated satisfactorily in every case due to the fact that impurities have penetrated into the valve mechanism thereby preventing water supply to be completely interrupted with a consequential flooding of the environment of the drinking bowl.

The present invention attempts to solve the problem without sacrificing previously achieved advantages such as easy operation of the valve mechanism. This purpose is achieved in an automatic water dispenser as defined in the claims in all its essential and characteristic aspects.

The invention is described in detail by reference to the attached drawing which is a central section of one embodiment of the automatic water dispenser according to this invention.

Generally speaking, the automatic water dispenser according to the invention comprises a drinking bowl 8 and a valve device 10 extending through the bottom of the bowl. In the embodiment shown both the drinking bowl 8 and the valve device 10 are manufactured of metal, it being understood that these parts as a whole or in part also may be manufactured of other material such as plastic.

Bowl 8 is substantially cup-shaped and has the shape of a truncated cone with the base turned upwardly. The upper edge 15 is rounded to eliminate risk of injury to animals drinking from the bowl.

The valve device 10 extends through a central hole in the bottom of bowl 8 and the bowl is sealingly attached such as by hard-soldering to a bead 17 on the valve housing 1. The lower portion 11 of valve housing 1 which extends downwardly from the lower side of the drinking bowl 8 is outwardly threaded for attachment of the automatic water dispenser to a water supply conduit.

The valve housing is a substantially cylindrical body having a diameter decreasing in a step-wise manner from bead 17 upwardly, the housing terminating above the maximum water level in the drinking bowl 8. Through the valve housing there extends a cylindrical bore having decreasing diameter in the upward direction. The valve mechanism proper in the valve housing is conventional and comprises, from the lower end upward, a filter ring 7 holding a filter 6 in position and a restricting portion 5 having a central flow-restricting aperture 18. Supported against the restricting portion which is screwed into the cylindrical bore, there is a pressure spring 4 biasing a valve disk 12 against a valve seat in the form of an O-ring 9 which in turn is supported by a shoulder in a position where the diameter of the cylindrical bore is further reduced.

From valve disk 12 a valve spindle 2 extends upwardly through the end portion 13 of the cylindrical bore in the valve housing. The outer end 14 of valve spindle 2 extends some distance beyond the upper end of valve housing 1. This end 14 is threaded for screwing connection with an actuator 3 adapted to be released by the drinking animal to open the valve.

The last part 13 of the cylindrical bore in the valve housing is slightly larger than the thickness of the spindle 2 thus enabling the spindle to be inclined to such an extent that the valve disk is disengaged from a portion of the seat and thereby opens a flow path for liquid through the cylindrical bore in the valve housing.

The actuator 3 which is shaped as a bell or cup is screwed onto the outer end 14 of valve spindle 2 and extends downwardly about valve housing 1 with a play sufficient to permit the necessary inclination of the valve spindle 2 in bore 13 as required to open the water supply. This play space also forms a part of the flowing path of the water into the drinking bowl.

In order to keep this play as small as possible, which contributes to reduced dimensions of the whole valve unit 10, valve disk 12 is positioned approximately centrally between the points of contact between valve housing 1 and actuator 3 when the latter is in its extreme position of inclination for opening the water supply.

The actuator 3 terminates at a short distance above a shoulder 19 on the outside of valve housing 1, said shoulder having an upper circumferential surface which is outwardly and downwardly inclined. The actuator 3 extends almost down to the bottom 16 of the drinking bowl. The actuator 3 is substantially cylindrical with an upper end portion shaped as a truncated cone and extends substantially above the highest possible water level in drinking bowl 8.

When an animal such as a hen intends to drink from the drinking bowl the animal puts down its beak into bowl 8 and thereby will actuate the actuator 3 with either the beak or another portion of the head. Water will pass through the cylindrical bore in the valve housing and into the cup-shaped cavity of the actuator 3. From there the water flows downwardly about the outer surface of valve housing 1 and will be diverted by the oblique circumferential surface on shoulder 19 in an outward direction. Thereby the water within the bowl is given a certain whirling motion so that any foodstuff residues and the like that may have settled on the bottom of the bowl after having been washed off from the beak of the hen will be whirlingly suspended and swallowed by the hen together with the water.

If the water supply is larger than the drinking consumption the water level in bowl 8 will rise. The hen will then withdraw the head and release the actuator 3 the conical upper end of which is intended to yield just this effect in combination with the upwardly increasing width of the bowl.

Due to the fact that valve housing 1 terminates above the highest possible water level in bowl 8 particles suspended in the water in the bowl cannot penetrate into the valve even during accidental backflow so that the function of the valve will not be impaired by any such particles. By causing the water to flow out near the bottom 16 of bowl 8 the whirling rendering the bowl self-cleaning will still be maintained.

In order to avoid subatmospheric pressure in the actuator 3 an air duct 20 is provided between the cavity in actuator 3 and the surrounding atmosphere.

What I claim is:

1. An automatic water dispenser for small-mouthed animals, in particular poultry, comprising in combination an open-topped drinking bowl and a vertically extending valve device centrally disposed in said bowl for supplying water to the interior thereof, said valve device including an open-ended hollow body member fixed to the bottom wall of said bowl and having means at its lower open end for securing it to a source of water supply with its upper open end projecting above the horizontal plane of the top edge of said bowl, whereby the bore of said body member serves as a conduit for flow of water from said source to and through the top open end of said member, a valve seat formed interiorly of said body member intermediate its opposite open ends, a valve member operatively associated with said valve seat having a stem extending axially through said valve seat and the upper end portion of said body member, biasing means in said body member for normally biasing said valve member into valve-closing engagement with said valve seat, the bore through said upper end portion of said body member being of a diameter sufficiently greater than that of said valve stem as to permit the latter to be canted relatively to the axis of said last-mentioned bore against the restraining bias of said biasing means and thereby tilt said valve member into an open position relatively to its seat, and a hook-like member secured to the free end of said valve stem adapted to be engaged by the mouth or beak of the animal to thereby tilt said valve member into valve-opening position and so effectively enable water to be supplied to said bowl, said hood-like member being provided with a downwardly presenting socket disposed in concentric relation to said body member and having walls which spatially surround the upper portion of said body member to provide an annular passage between said body member and the surrounding walls of said socket for delivery of drinking water from the upper open end of said body member downwardly into said drinking bowl.

2. An automatic water dispenser as defined in claim 1 wherein said valve seat and the valve member operatively associated therewith are located at a level approximately midway between the upper and lower points of contact between said body member and the surrounding walls of said socketed cap member when the valve member is tilted into valve-opening position.

3. An automatic water dispenser as defined in claim 1 wherein said body member includes an apertured internal abutment spaced upstream from said valve member and said biasing means consists of a coiled compression spring interposed between said valve member and said abutment operative to normally hold said valve in closed position.

4. An automatic water dispenser as defined in claim 3 wherein said internal abutment is threadedly secured in said body member with the aperture thereof in axial alinement with the central opening of said valve seat, said abutment serving to meter the flow of water from its source of supply through the dispenser when said valve member is in its opened position.

5. An automatic water dispenser as defined in claim 1 wherein said body member is provided in the region of the bottom end of said socket with a circumferentially extending downwardly and outwardly flaring shoulder which is in spaced relation to said bottom end of the hood socket to provide therewith an annular discharge opening for forcefully directing the dispensed water toward the bottom wall of the bowl to thereby create a turbulence for maintaining suspended in the water any food-stuff residue that may have been washed off the mouth or beak of the animal during its drinking of water from the bowl.

6. An automatic water dispenser as defined in claim 1 wherein the closed upper end of said hood-like member is axially spaced vertically above the upper open end of said body member whereby it is freely accessible externally of the bowl for valve-opening actuation by the animal which seeks to drink water from the bowl.

7. An automatic dispenser as defined in claim 6 wherein said closed upper end of said hood-like member is provided with a vent open to atmosphere to prevent any sub-atmospheric pressure within said valve device from interfering with free flow of water into the bowl while said valve member is in its opened position.

* * * * *